United States Patent [19]

Merchant

[11] Patent Number: 5,737,759

[45] Date of Patent: Apr. 7, 1998

[54] METHOD AND APPARATUS FOR MAINTAINING CACHE COHERENCY IN A COMPUTER SYSTEM WITH A HIGHLY PIPELINED BUS AND MULTIPLE CONFLICTING SNOOP REQUESTS

[75] Inventor: Amit A. Merchant, Portland, Oreg.

[73] Assignee: Intel Corporation, Santa Clara, Calif.

[21] Appl. No.: 825,718

[22] Filed: Apr. 4, 1997

Related U.S. Application Data

[62] Division of Ser. No. 568,248, Dec. 6, 1995.

[51] Int. Cl.[6] .................................................. G06F 12/08
[52] U.S. Cl. ........................... 711/146; 711/152; 711/140
[58] Field of Search ............................ 711/3, 141–146, 711/140, 210, 152, 163, 133–136, 118–122; 395/182.04, 200.78

[56] References Cited

U.S. PATENT DOCUMENTS 5,325,503  6/1994  Stevens et al. ............................ 711/146
5,335,335  8/1994  Jackson et al. ........................... 711/121
5,355,467  10/1994  MacWilliams et al. .................. 711/146
5,463,753  10/1995  Fry et al. .................................. 711/146
5,572,703  11/1996  MacWilliams et al. .................. 711/146

*Primary Examiner*—Matthew M. Kim
*Attorney, Agent, or Firm*—Blakely, Sokoloff, Taylor & Zafman

[57] ABSTRACT

An efficient method for handling multiple conflicting snoop requests with minimal stalling on the external bus by using blocking conditions to maintain and update a snoop queue for maintaining cache coherence in a computer system with caching units. An entry in a snoop queue is allocated to a snoopable request which has an associated snoop address. The snoop address is compared with addresses corresponding to previously allocated entries stored in the snoop queue. A block condition is set if there is a match between the snoop address and one or more of the addresses stored in the snoop queue. One or more history bits are set in the snoop queue indicating a chronological ordering of the entry in the snoop queue. A snoop operation corresponding to the snoop request is blocked until the block condition is cleared.

10 Claims, 11 Drawing Sheets

METHOD AND APPARATUS FOR MAINTAINING CACHE COHERENCY IN A COMPUTER SYSTEM WITH A HIGHLY PIPELINED BUS AND MULTIPLE CONFLICTING SNOOP REQUESTS

This is a divisional of application application Ser. No. 08/568,248, filed Dec. 6, 1995.

BACKGROUND OF THE INVENTION

1. Field of the Invention

The described invention relates to the field of cache coherency. In particular, the described invention relates to cache coherency of a multiprocessor computer system which has a highly pipelined bus.

2. Description of Related Art

Since the beginning of electronic computing, main memory access has been much slower than processor cycle times. Access time is the time between when a read is initially requested and when the desired data word arrives. Processor cycle time refers to the minimum time between successive instruction executions. The gap between memory access time and processor cycle times continues to widen with advances in semiconductor technology. Efficient mechanisms to bridge this gap are central to achieving high performance in future computer systems.

The conventional approach to bridging the gap between memory access time and processor cycle time has been to introduce a high-speed memory buffer, commonly known as a cache, between the processor and main memory. The idea of a cache memory dates back several decades ago and was implemented in early computer systems such as the IBM system 360/85. Today, caches are ubiquitous in virtually every class of general purpose computer system. Very often, data stored within one cache memory is shared among the various processors or agents which form the computer system. The main purpose of a cache memory, of course, is to provide fast access time while reducing bus and memory traffic. A cache achieves this goal by taking advantage of the principles of spatial and temporal locality.

As semiconductor technology has continued to improve, the gap between memory access time and central processing unit (CPU) cycle time has widened to the extent that there has arisen a need for a memory hierarchy which includes two or more intermediate cache levels. For example, two-level cache memory hierarchies often provide an adequate bridge between access time and CPU cycle time such that memory latency is dramatically reduced. In these types of computer systems the first-level, primary cache (i.e., L1) provides fast, local access to data, while the second-level cache (i.e., L2) provides good data retention in bus and memory traffic.

Main memory is typically the last or final level down in the hierarchy. Main memory satisfies the demands of caches and vector units and often serves as the interface for one or more peripheral devices. Most often, main memory consists of core memory or a dedicated data storage device such as a hard disk drive unit.

One of the problems that arise in computer systems that include a plurality of caching agents and a shared data cache memory hierarchy is the problem of cache coherency. Cache coherency refers to the problem wherein—due to the use of multiple, or multi-level, cache memories—data may be stored in more than one location in memory. By way of example, if a microprocessor is the only device in a computer system which operates on data stored in memory, and the cache is situated between the CPU and memory, there is little risk in the CPU using stale data. However, if other agents in the system share storage locations in the memory hierarchy, this creates an opportunity for copies of data to be inconsistent, or for other agents to read stale copies.

Cache coherency is especially problematic in computer systems which employ multiple processors as well as other caching agents (e.g., input/output (I/O) devices). By way of example, a program running on multiple processors requires that copies of the same data be located in several cache memories. Thus, the overall performance of the computer system depends upon the ability to share data in a coherent manner.

As will be seen, the described invention provides a cache protocol for a computer system supporting high performance memory hierarchy with complete support for cache coherency. The cache protocol of the described invention supports multiple caching agents (e.g., microprocessors) executing concurrently, as well as writeback caching and multiple levels of cache memory. The cache protocol supports a highly-pipelined bus architecture which interconnects the various caching agents.

SUMMARY OF THE INVENTION

The invention is a method for maintaining cache coherence. A snoopable request is allocated to an entry in a snoop queue. The snoopable request is blocked to delay performing a snoop operation in response to the snoopable request until a blocking condition is satisfied. After the blocking condition is satisfied, a snoop operation is performed in response to the snoopable request. The entry is deallocated from the snoop queue.

DETAILED DESCRIPTION

A method and apparatus are described for maintaining cache coherency in a computer system that has a highly-pipelined bus such as that described in copending application entitled "Highly Pipelined Bus Architecture", Ser. No. 08/206,382, filed Feb. 28, 1994, which application is assigned to the assignee of the present application. In the following description, numerous specific details are set forth, such as particular structures, timing diagrams, transactions, operations, etc., in order to provide a thorough understanding of the invention. It should be understood, however, that these specific details need not be used to practice the invention. In other instances, well-known structures, circuits, and architectural functions have not been described in detail in order to avoid obscuring the present invention. External bus transactions are described for one embodiment of system bus 20 (to be described with reference to FIG. 1) in the U.S. Pat. No. 5,568,620, issued Oct. 22, 1996 entitled, "Method and Apparatus for Performing Bus Transactions in a Computer System"; which is assigned to the assignee of the present application.

In the detailed description, a number of terms are frequently used to describe certain characteristics of components within the computer system. These terms are not mutually exclusive. A "requesting agent" is the agent initiating a request typically to read or write data. A "responding agent" is an agent responding to the request by providing the data. A "caching agent" is an agent having cache capabilities such as a microprocessor. A "snooping agent" is an agent that snoops its internal memory for data requests by a bus transaction, normally initiated by one of the caching agents. More general terms include a "receiving" agent, which is an agent receiving data, and a "data transfer" agent being a requesting agent, responding agent or snooping agent transferring data along the system bus.

Figure 1:
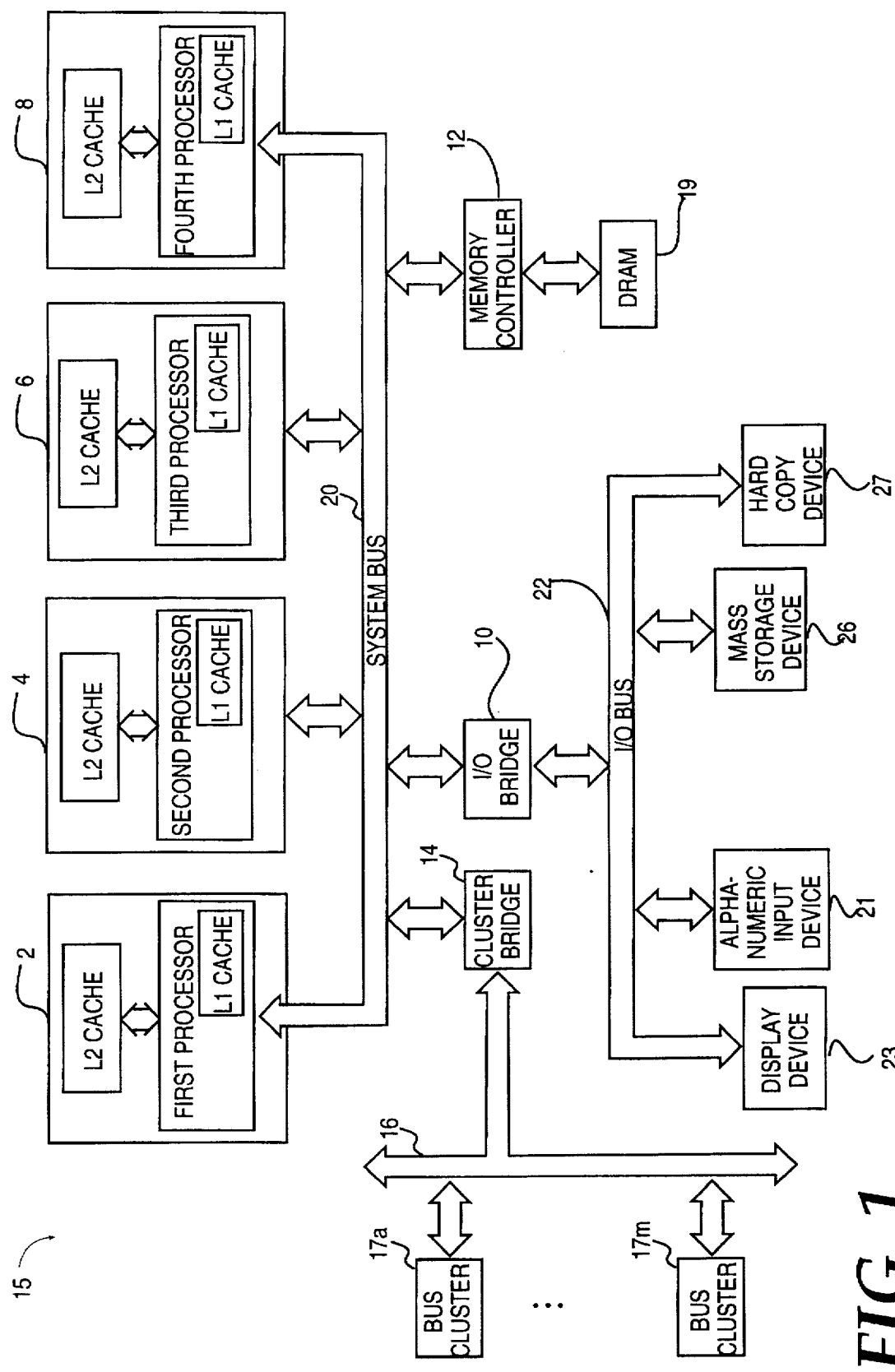
FIG. 1 is a block diagram of a bus cluster including four microprocessors along with an I/O bridge and a memory controller coupled to system bus.

FIG. 1 is a block diagram of a bus cluster 15 including four microprocessors 2, 4, 6, and 8, along with an I/O bridge 10 and a memory controller 12 coupled to system bus 20. Each of these above-identified "agents" is capable of sending and/or receiving data or messages over the bus. In this embodiment, the I/O bridge 10 provides a communication path between the system bus 20 and a number of peripherals coupled to an I/O bus 22 including, but not limited to, a display device 23, alphanumeric input device 21, mass storage device 26, and hard copy device 27. In this same embodiment, the memory controller 12 is coupled to a set of dynamic random access memories 19 (DRAM), however other memory devices are foreseeable. Moreover, a cluster bridge 14 is coupled to the system bus 20 and a cluster interconnect 16 which allows the bus cluster to communicate with other bus clusters 17a–17m ("m" being arbitrary).

The signal lines and logic of the system bus 20 is implemented using Gunning Transceiver Logic (GTL) from Xerox® Corporation which provides low power consumption and electromagnetic interference (EMI). The use of this technology allows up to eight agents to be coupled to system bus 20 while still maintaining a bus clock speed of up to 100 MHz. Various embodiments incorporate various clock speeds including 33.3 MHz, 44.4 MHz, and 66.7 MHz although other clock speeds may also be used. These clock speeds allow the invention to be incorporated into computer systems having various hardware capabilities.

Figure 2:
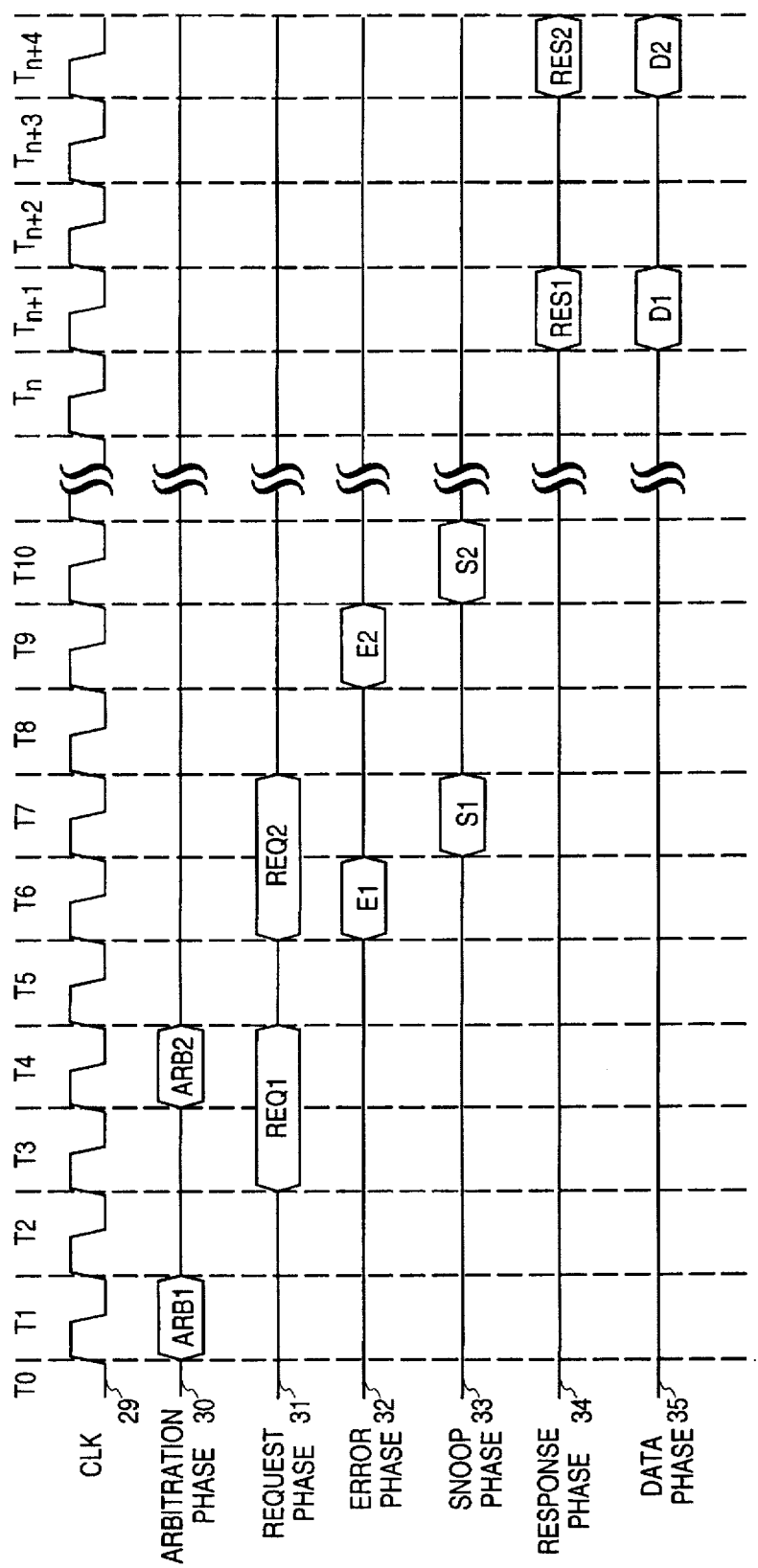
FIG. 2 is a timing diagram illustrating the phases of two bus transactions supported by the system bus of FIG. 1.

FIG. 2 is a timing diagram illustrating the phases of two bus transactions supported by the system bus of FIG. 1. Each bus transaction includes six phases; appropriately separated by a selected number of clock cycles (labeled "T1", "T2", etc.) of a system clock "CLK" 29, namely, Arbitration, Request, Error, Snoop, Data, and Response. It is contemplated that these phases may be arranged with various timing components as needed.

During the Arbitration Phase 30, ownership of the bus during the remaining phases is determined. During the Request Phase 31, the agent "owning" the system bus of the Arbitration Phase provides information necessary for other agents to begin the transaction desired by the requesting agent. This information includes an address of the data to be manipulated, if any, as well as a code indicating the operation to be performed. Any parity errors detected during the Request Phase will cause an error signal to be asserted during the Error Phase 32. During the Snoop Phase 33, the results of snoops performed by any caching agents on the system bus are asserted. During the Data Phase 35, any requested data transfer is accomplished. The transaction is removed from the bus pipeline, and the results of that transaction are asserted during the Response Phase 34. Various signals are used during each phase to supply information as discussed below.

The types of transactions supported in the preferred embodiment include, but are not limited to, (i) cache line reads and writes, where a cache line consists of thirty-two bytes or four 8 byte "chunks"; (ii) eight and sixteen byte reads and writes (referred to as partial cache line reads and writes); (iii) cache line read invalidates; and (iv) cache line invalidates. An invalidate transaction causes other caching agents to place their cache line in an "Invalid" state (See below for explanation of invalid) so that the requesting agent can obtain exclusive ownership of the requested data within its own cache. While these are the transactions supported in one embodiment of the invention, other implementation could utilize a different set of transactions while still incorporating the invention.

In performing bus arbitration, each agent of FIG. 1 relies on four groups of arbitration signals; namely, BR[3:0]#, BPRI#, BNR# and LOCK# signals. The BR[3:0]# signals are bus request signals used for receiving and sending bus ownership requests. The BPRI# signal is a priority request signal used to indicate that an agent is receiving bus ownership requests from a high priority bus agent. Furthermore, a LOCK# signal is a bus-locked transaction signal used by an agent to signal all other agents that bus ownership is currently locked, i.e., bus ownership cannot change while any agent is asserting the LOCK# signal. The BNR# signal is asserted by any agent to temporarily request all other agents from asserting new bus transactions.

In the Request Phase, the signals used to create a new bus transaction request are ADS#, REQ[4:0]#, A[35:3]#, AP[1:0]# and RP#. An assertion of ADS# indicates that the remaining signals in the Request Phase are valid. REQ[4:0]# indicate the type of request made during a bus transaction. The A[35:3]# indicate the address, if any, targeted by the requested bus transaction. The RP# and AP[1:0]# provide parity protection on signals REQ[4:0]# and A[35:3]#, respectively. In one embodiment, signals ADS#, REQ[4:0]#, A[35:3]#, AP[1:0]# and RP# are valid for two consecutive clock cycles beginning from when ADS# is asserted.

In the Error Phase, AERR# is asserted if the request signals contain a parity error. An assertion of AERR# aborts the transaction in progress and requires the agent issuing the transaction to restart it from the Arbitration Phase. AERR# assertion also requires all agents to re-synchronize their arbitration state to allow "auto-correction" due to parity errors occurring from arbitration failures.

In the Snoop Phase, the signals used to provide snoop results in the preferred embodiment are HIT# and HITM#. HIT# is asserted by every caching agent intending to keep data in a Shared state. HITM# is asserted by any caching agent which has the requested data in Modified state (defined below). If HITM# is asserted during the Snoop Phase, the requesting agent, the snooping agent and the memory agent are notified that an Implicit Writeback will take place so that data coherency may be preserved. In an implicit writeback, the memory agent keeps off the data bus, and the data is supplied by the snooping agent.

In one embodiment, if any agent needs additional time to complete a snoop, both HIT# and HITM# are asserted simultaneously for one cycle which causes a delay of the Snoop Phase for two cycles. It should be noted that such a snoop stall produced by the assertion of the HIT# and HITM# signals only stalls the snoop phase, the data phase is not affected. Additionally, if the responding agent determines that the requested data is not immediately available, it can assert a DEFER# signal which provides the responding agent with the option of restarting the transaction to provide the requested data at a later time, or have the requesting agent retry the transaction at a later time.

The Response Phase indicates the end of a transaction and that the Response/Snoop Initiated Data Phase has begun. Signal RS[2:0]# are used to send a coded message indicating that the Response Phase has been entered and the results of the transaction. These "response results" are listed in Table 0 below:

TABLE 0

| RESPONSE RESULTS | | | |
| --- | --- | --- | --- |
| CODED MESSAGE | RS2# | RS1# | RS0# |
| Idle | 0 | 0 | 0 |
| Retry | 0 | 0 | 1 |
| Deferred | 0 | 1 | 0 |
| Reserved | 0 | 1 | 1 |
| Hard Failure | 1 | 0 | 0 |
| No Data | 1 | 0 | 1 |
| Implicit Writeback | 1 | 1 | 0 |
| Normal Data | 1 | 1 | 1 |

The response results remain "Idle" until any one of RS[2:0]# is asserted. A "Retry" response is only allowed when DEFER# (with HITM# inactive) is asserted during Snoop Phase. With the Retry response, the response agent informs the requesting agent that the transaction must be retried. A "Hard Failure" is a valid response which indicates a transaction failure. It results in the requesting agent taking recovery action. A "No Data" response is provided when no data will be returned by the addressed agent and DEFER# and HITM# are inactive during the Snoop Phase. An "Implicit Writeback" is the response when HITM# is asserted during the Snoop Phase. In an "Implicit Writeback," the memory agent keeps off the data bus, and the data is supplied by the snooping agent. The memory agent drives the response and accepts the modified cache line from the snooping agent. A "Normal Data" response is provided when the bus request during from Request Phase requires a read response and both HITM# and DEFER# are deasserted during the Snoop Phase. With "Normal Data" response, the responding agent transfers read data along with the response.

During the Data Phase, a number of bus lines are driven, namely those bus lines associated with D[63:0]#, DEP[7:0] #, DRDY#, and DBSY#. D[63:0]# are data signals, each dedicated to propagate one data bit through sixty-four data lines. DEP[7:0]# are parity signals used in conjunction with the D[63:0]#. DRDY# and DBSY# are signals used to coordinate and control the use of data lines D[63:0]#. All Data Phase bus signals, DBSY#, DRDY#, D[63:0]#, and DEP[7:0]# are driven by the data transfer agent. To place data on lines D[63:0]# during clock cycle "n", the data transfer agent must observe DBSY# deasserted during clock cycle "n−1" indicating the data lines will be free during the next transaction. DRDY# is asserted when valid data is placed on data lines D[63:0]#. Additionally, a bus signal TRDY# is asserted by the responding agent sometime before the Data Phase for Request-Initiated ("write") transactions to indicate that the responding agent is ready to receive data from the requesting agent. TRDY# is also used to indicate readiness to receive data from a snooping agent containing modified data during an Implicit Writeback transaction.

The system bus used in the preferred embodiment of the invention maintains data coherency by utilizing the MESI cache protocol. MESI cache protocol requires that each caching agent on the system bus associate one of four states with each line of data it caches. These states are "Modified", "Exclusive", "Shared", and "Invalid", hence "MESI". More specifically, a cache line in Modified state indicates that the data has been altered by the caching agent and therefore may be different than the corresponding data available from the memory agent. In one embodiment, this data in the Modified state is the most up-to-date version of the data available. In addition, a cache line in Exclusive state indicates that the caching agent has data identical to that stored in the memory agent and no other caching agent is currently caching data corresponding to the same address. A cache line in Shared state indicates that its caching agent, other caching agents and the memory agent have a current version of the data. A cache line in Invalid state indicates that data within the cache line is invalid. By requiring each caching agent to perform a snoop based on the information provided during the Request Phase and then asserting its results in the Snoop Phase, the MESI cache protocol provides for cache coherence.

Figure 3:
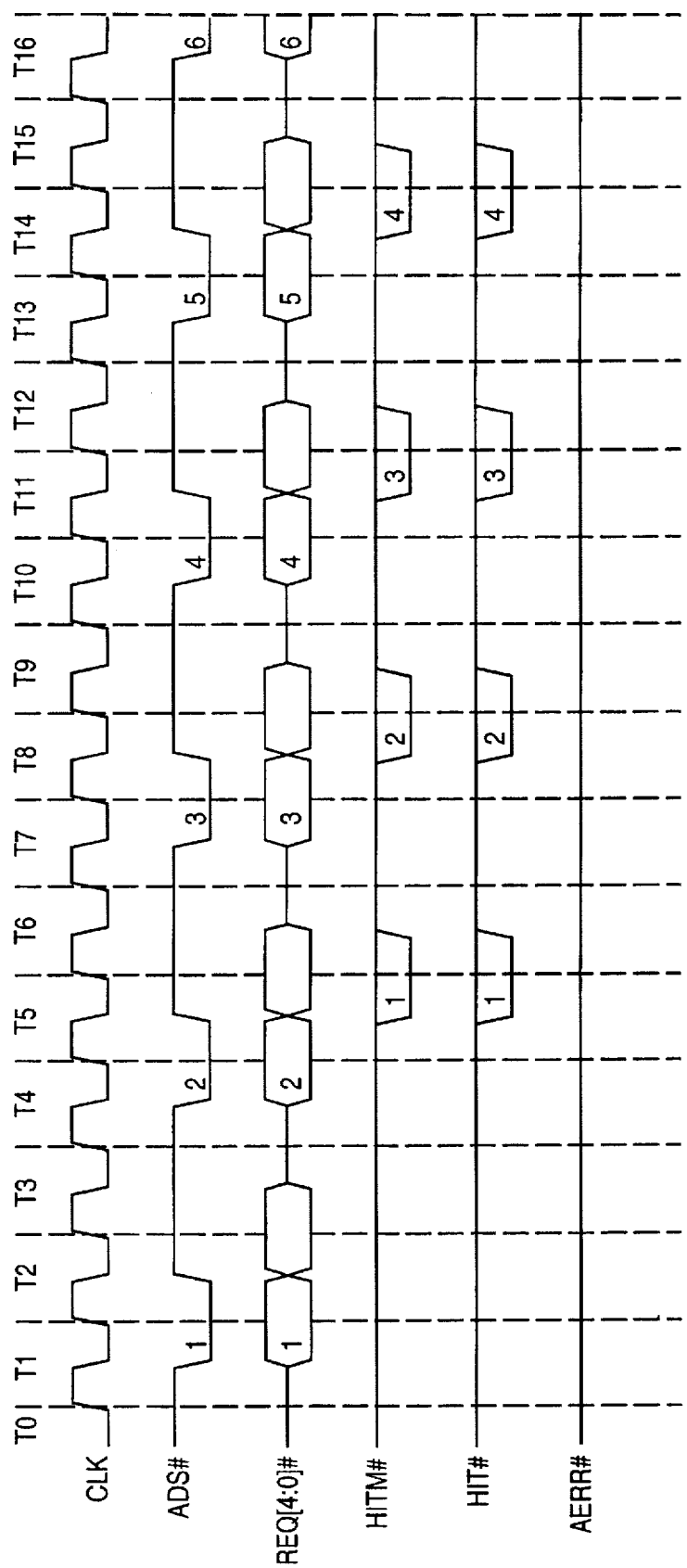
FIG. 3 is an illustrative timing diagram of a normal snoop phase on the system bus.

FIG. 3 is an illustrative timing diagram of a normal snoop phase on the system bus 20. Each read transaction begins with the assertion of ADS#. In FIG. 3, for each read transaction, a snooping agent must snoop its cache to determine whether it contains a copy of the data from the requested address. The snooping agent responds by asserting HITM# if the snooping agent has a copy of the data from the requested address in the M state. The snooping agent responds by asserting HIT# if the snooping agent has a copy of the data from the requested address in the E state or the S state. The snooping agent responds by asserting neither HITM# nor HIT# if the caching agent does not have a copy of the data from the requested address (or is in I state).

The read transactions on the system bus are pipelined such that a subsequent read transaction may be started prior to a current read transaction completing. In FIG. 3, the snoop responses indicated by the assertion or non-assertion of HITM# and HIT# are labeled to indicate the corresponding ADS# to which the snoop response corresponds.

When the bus requests are orthogonal, i.e., when the processing of one request is not dependent on the outcome of a previous request, snoop logic produces no stalls in the snoop phase. However, certain special procedures are performed if two non-orthogonal bus requests appear in close temporal succession on the system bus.

For example, if the cache line was originally in modified state in either the L1 or the L2 cache, then the snoop probe from the first request would elicit a HITM# from either the L1 or L2 caches and await a writeback to the external bus during the data transfer phase of the transaction. However, if a second request is made to the same line on the system bus, then the snoop response is dependent on the outcome of the previous request, since the previous request may alter the cache state. In this example, if the first request is canceled then the snooping agent needs to turnaround and respond with a HITM# in the snoop phase of the second transaction and supply the line during the data transfer phase of the second transaction. However, if the first request is not canceled the snooping agent needs to await the state change before responding with a HITM# or HIT# for the second request. Thus, these two requests are non-orthogonal.

Two general solutions can be applied to handle these non-orthogonal transactions. One possible solution is conditioning the snoop response by forwarding state change and cancellation information to circuitry that evaluates the feedback from the L1 and the L2 caches. In one embodiment, the snoop logic may be able to handle the above case without stalling the snoop requests. However, this solution requires the core to handle snoops in a complicated fashion.

A simpler solution is to block snoop probes from bus requests that have a dependency on a previous request. Blocking is easier to accomplish. However, blocked requests need to be awakened as soon as the blocking condition clears.

In one embodiment, a caching agent blocks by injecting snoop stalls on the system bus 20. This snoop stall signals the other caching agents that a snoop response will be delayed. In one embodiment, the caching agent signals a snoop stall by asserting both HITM# and HIT# simultaneously, and this signals that the snoop request is delayed for two clock cycles. In this embodiment, the snoop stall can be repeated numerous times if a longer delay is needed.

There are various non-orthogonal transactions in which snoop requests may need to be blocked, such as:

0) Two requests to the same line. (X-X)

1) Three or more requests to the same line. (X-X-X)

2) Two requests to the same line separated by one or more requests to another line. (X-Y-X)

3) Two sets of non-orthogonal requests. (X-Y-X-Y, X-Y-Y-X)

4) An unknown address for a deferred reply transaction. (?(D) -X)

5) Line eviction in progress as a snoop request arrives. (X(Bkwd Inq) -X)

Figure 4:
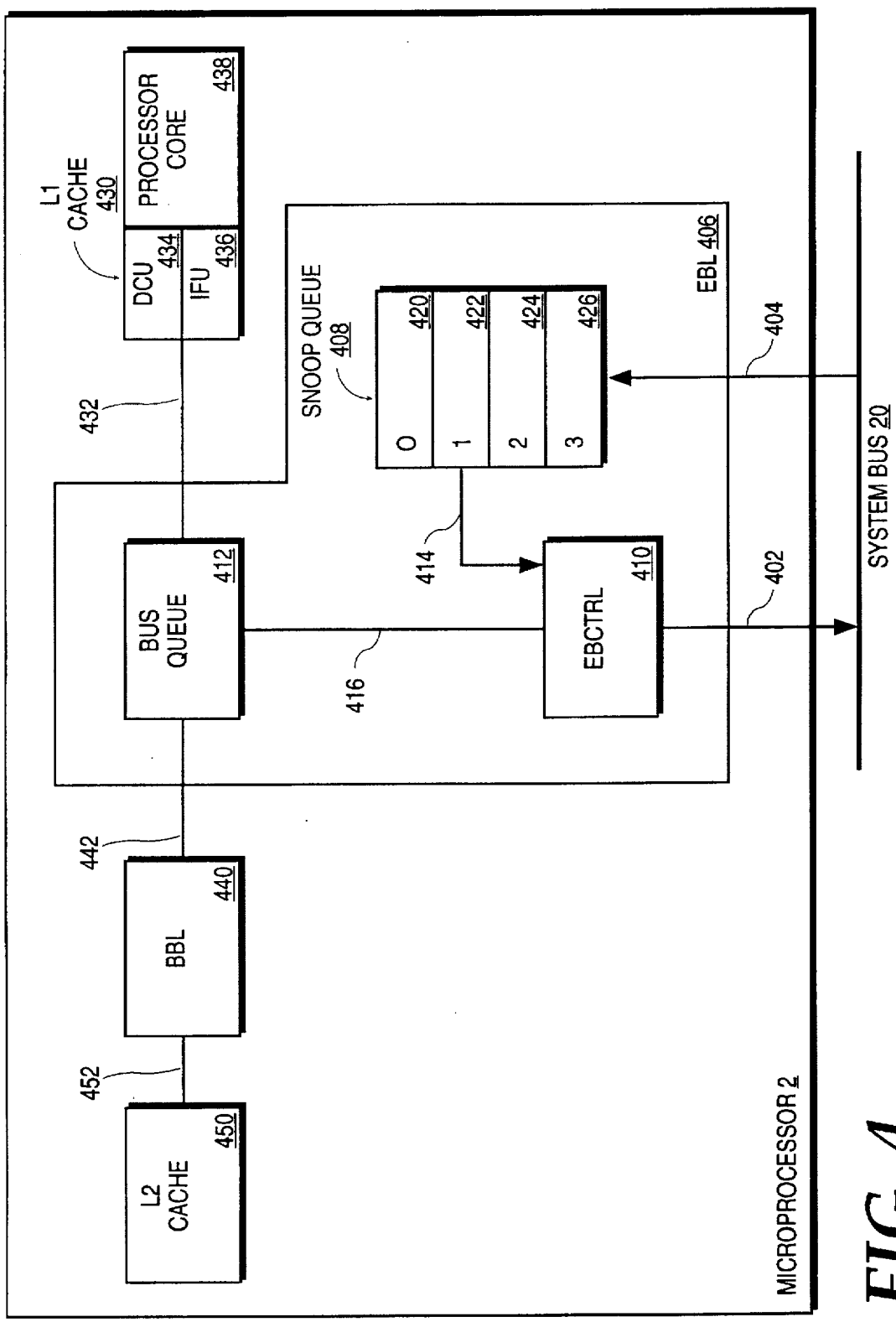
FIG. 4 is a block diagram of a microprocessor which includes the snoop queue of the present invention.

FIG. 4 is a block diagram of one of the microprocessors in FIG. 1, such as microprocessor 2. The microprocessor 2 is coupled to system bus 20 via bus 402 and bus 404. The external bus logic (EBL) 406 is comprised of a snoop queue 408, an external bus controller 410, and a bus queue 412. The snoop queue is coupled to the external bus controller 410 via a bus 414. Bus queue 412 is coupled to the external bus controller 410 via a bus 416. The snoop queue 408 is comprised of four entries: entry_0 420, entry_1 422, entry_2 424 and entry_3 426.

The EBL 406 is coupled to a data cache unit (DCU) 434 and an instruction fetch unit (IFU) 436. Together the DCU 434 and the IFU 436 make up the L1 cache 430. The DCU 434 and the IFU 436 are coupled to a processor core 438. The EBL 406 is also coupled to Backside Bus Logic (BBL) 440 via a bus 442. The BBL 440 is coupled to an L2 cache 450 via a bus 452. In one embodiment, the L2 cache is on one die and the BBL 440, EBL 406, L1 Cache 430, and processor core 438 are on another die. The two dies are bonded together in the same package.

A snoop request is initiated within the microprocessor 2 by issuing a snoop probe to the L1 and the L2 caches. The snoop probe is an internal request seeking to determine whether the L1 and L2 caches have a copy of the requested data. The snoop probe serves two purposes. It inquires about the status of the L1 and L2 caches, and it also changes the state of the caches. For example, if the DCU 434 had a cache line in M state, and a snoop probe were issued to the DCU 434 in regard to that cache line, then the DCU 434 would respond by signaling that the cache line was in M state. The DCU 434 would also change the cache state to a "locked" state such that neither the processor core 438 nor another caching agent could access the cache line until the current snoop request has completed.

In response to the probe finding a cache line in M state, a confirm request is performed in which writeback data is provided to the system bus 20. In addition, the cache line assumes its final state. However, if the probe did not find the cache line in the M state, then the confirm request is not necessary. For example, if the cache line is in S state, no confirm request is necessary since no writeback need be performed.

A third possible response to a snoop probe is an abort. If for some reason, there is an error, for example, a parity error on the system bus 20, then the snoop request may be canceled. If a snoop is aborted after changing the cache state to a "locked" state in response to a snoop probe, then circuitry takes the cache line out of the "locked" state such that a second snoop responds properly following the aborted first snoop request. A parity error on the system bus 20 is indicated by the assertion of an AERR# signal during the Error Phase 32 of the bus request.

Thus, it can take varying amounts of time to perform a complete snoop request, and while some snoop requests can be processed independently, other snoop requests are dependent upon a preceding snoop request.

The snoop queue 408 handles the complexities of maintaining a list of the pending snoop requests and their dependencies. The snoop queue 408 maintains strict bus ordering such that all snoops requests are initiated in the same order in which they entered the snoop queue 408. In-order execution of snoop requests is a common method of handling snoop queuing.

In one embodiment, the snoop queue 408 includes four entries. (See Table 1, below). Each entry has an associated valid bit which indicates that the entry has valid data. Each entry also has an associated address field. This address field holds the address for the snoop request. However, for one embodiment, deferred reply transactions do not store an address in the address field since an address is not available for the deferred reply transaction, as will be described later.

The snoop queue 408 also includes both a block bit and a sleep bit for each entry. If an entry has its block bit set, this indicates that the entry must wait until all previously pending requests complete before the snoop operation for this entry can be initiated. One condition for the block bit to be set is when the entry has an address which overlaps with the same cache line as that of another bus request in the snoop queue 408. Another condition for the block bit to be set is when a previously-allocated entry is a deferred reply. In this case, the address of the deferred reply is not available to the snoop queue 408. Therefore, for simplicity, the snoop queue 408 assumes that the address of the deferred reply overlaps with a subsequently allocated bus request to the snoop queue 408.

If an entry has its sleep bit set, this indicates that this entry has a "weak" dependency upon the previous entries, i.e., the valid entries in the snoop queue 408 at the time that this entry was allocated in the snoop queue. This "weak" dependency maintains strict chronological bus ordering. Thus, as soon as all entries in the snoop queue which were pending at the time that the current entry was added to the snoop queue have been initiated, then the snoop operation for the current entry can be initiated.

Each entry of the snoop queue also has history bits, or oldest blocked request (OBR) bits. Each entry has an OBR bit corresponding to each of the other entries of the snoop queue 408. The OBR bits indicate whether one of the other entries was pending at the time the current entry was allocated. When an entry is deallocated from the snoop queue, all OBR bits associated with that entry are cleared. Thus, at any time, by looking at the OBR bits associated with an entry, it is possible to tell which of the other entries were allocated in the snoop queue prior to the current entry.

An example will illustrate the manner in which the different fields of each entry interact with one another. Table 1 indicates a four entry snoop queue which has an initial condition which includes valid data for entries #0 and #3. Consider an incoming request with address 1000 allocated to entry #1. The entry is "blocked" because of an address match with address 1000 of entry #0 (previously allocated). Thus, the block bit of entry #1 is set. The OBR bits 0 and 3 are set for entry #1 to signify its two ancestors—the valid entries in the snoop queue at the time that entry #1 was allocated. In one embodiment, the sleep bit is set whenever the block bit is set for an entry.

TABLE 1

| Entry # | Valid | Address | Block | Sleep | OBR bits 0 | 1 | 2 | 3 | comment |
|---|---|---|---|---|---|---|---|---|---|
| #0 | 1 | 1000 | | | x | 0 | 0 | 0 | |
| #1 | 1 | 1000 | B | S | 1 | x | 0 | 1 | ←allocated, blocked |
| #2 | 0 | | | | | | x | | |
| #3 | 1 | 9999 | | | 1 | 0 | 0 | x | |

In Table 2, a snoop request with address 2000 is allocated to entry #2, and at the same time, entry #3 is deallocated as the snoop request fully completes. The sleep bit for entry #2 is set since the snoop request for this entry must wait for the previous blocked condition of entry #1 to clear in order to maintain bus ordering. The OBR bits for entry #2 indicate that entry #0 and entry #1 were pending to be initiated at the time of allocation of entry #2. When entry #3 is deallocated, all of the OBR bits corresponding to entry #3 in all of the entries are cleared, i.e., all of the OBR bits in column #3 are cleared. All of the row OBR bits of entry #3, i.e., all of the OBR bits of entry #3, are also cleared.

TABLE 2

| Entry # | Valid | Address | Block | Sleep | OBR bits 0 | 1 | 2 | 3 | comment |
|---|---|---|---|---|---|---|---|---|---|
| #0 | 1 | 1000 | | | x | 0 | 0 | 0 | |
| #1 | 1 | 1000 | B | S | 1 | x | 0 | 0 | |
| #2 | 1 | 2000 | | S | 1 | 1 | x | 0 | ←allocated, sleep |
| #3 | 0 | | | | 0 | 0 | 0 | x | ←deallocated |

In Table 3, entry #0 is deallocated which removes the blocking condition from entry #1. Column #0 and row #0 are reset upon the deallocation of entry #0. The valid bit for entry #0 is also reset. Upon deallocation of entry #0, the block and sleep bits for row #1 are reset.

TABLE 3

| Entry # | Valid | Address | Block | Sleep | OBR bits 0 | 1 | 2 | 3 | comment |
|---|---|---|---|---|---|---|---|---|---|
| #0 | 0 | | | | x | 0 | 0 | 0 | ←deallocated |
| #1 | 1 | 1000 | | | 0 | x | 0 | 0 | ←wake up, probe |
| #2 | 1 | 2000 | | S | 0 | 1 | x | 0 | |
| #3 | 0 | | | | | | | x | |

In the next cycle, entry #1 is woken up and a snoop probe is dispatched for this entry. Upon deallocation of entry #1, the valid bit for entry #1 is reset, and the OBR column #1 bits are reset. Note that at any time the summation of the OBR bits for any entry in the snoop queue provides an index into the relative age of that entry.

Figure 5:
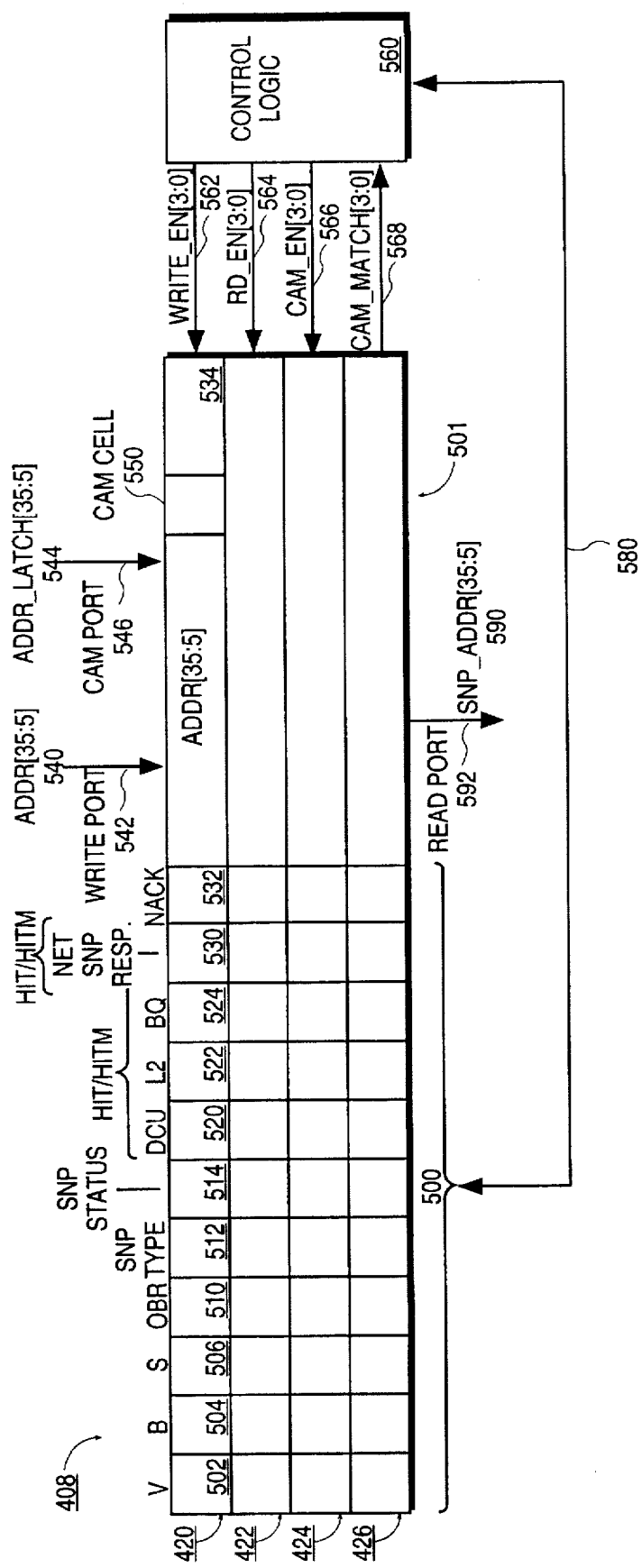
FIG. 5 is a block diagram showing the circuitry of the snoop queue.

FIG. 5 is a block diagram showing the circuitry of the snoop queue 408. In one embodiment, each of the entries is comprised of a plurality of control and status bits 500 and a plurality of CAM cells 501.

In one embodiment of the invention, the snoop queue 408 has four entries 420–426. Each entry has control and status bits 500 comprising: a valid bit 502, a block bit 504, a sleep bit 506, four OBR bits 510, four snoop type bits 512, three snoop status bits 514, six snoop response bits 520, 522, and 524, two net snoop response bits 530, and a NACK bit 532. The valid bit 502, the block bit 504, the sleep bit 506, and the OBR bits 510 have already been described with reference to Tables 1–3.

The four snoop type bits 512 indicate the type of the snoop request. The snoop type bits can indicate that the snoop request is a read, a read invalidate, a write, a defer reply, or a special cycle. Additionally, the snoop type may indicate whether the snoop request is generated from within the same microprocessor or whether it is generated by an external caching agent.

The three snoop status bits 514 indicate a status of the snoop request which include whether a snoop probe is pending or complete, whether a snoop abort is pending or complete, and whether a snoop confirm is pending or complete.

The six snoop response bits 520, 522, and 524 include a HIT and HITM pair of bits for each of the caching units: the DCU 434, the L2 cache 450, and the bus queue 412. The HIT and HITM bit pair correspond with HIT# and HITM# MESI protocol signals indicating the snoop state of the corresponding caching unit. The six snoop response bits 520, 522, and 524, are used to determine the net snoop response bits 530, which is a cumulative snoop response generated from the results of the various caching units. The net snoop response bits 530 also include a HIT and HITM bit pair.

The NACK bit 532 indicates whether an address parity error was observed by any agent on the external bus during the error phase, as will be explained in the flow diagram of FIG. 8.

An address bus 540 for providing an upper thirty-one address bits [35:5]534, is presented via a write port 542 to the plurality of CAM cells 501. A write port is defined to have an input address and a write enable. The write enable signal 562 for the write port 542 will be discussed later.

In one embodiment, each entry 420–426 of the snoop queue 408 has the same number of CAM cells as the number of bits of the address bus 540. Each one of the CAM cells corresponds to a particular bit of the address bus 540. A representative CAM cell 550 is shown. In the representative embodiment, there are 31 CAM cells per each of the 4 entries.

A latched address bus (addr_latch) 544 is coupled to each of the plurality of CAM cells 501 of each of the entries of the snoop queue via a cam port 546. A cam port includes an address input, a cam enable signal, and a match output. A cam enable signal 566 and a cam match signal 568 will be discussed later.

Each of the CAM cells is coupled to control logic 560. The control logic 560 provides a write enable signal 562, a read enable signal 564, and a cam enable signal 566 to each of the four entries of the snoop queue 408. Each entry of the snoop queue provides a cam match signal 568 to the control logic 560. The control logic 560 is coupled to the control and status bits 500 of the snoop queue 408 via a bus 580. The control and status bits 500 provide information used by the control logic 560 to generate the write enable signal 562, the read enable signal 564, and the cam enable signal 566. Similarly, the control logic provides the setting and clearing of certain control and status bits 500 via the bus 580. For example, the control logic 560 controls the block bit 504 and the sleep bit 506 in response to the cam match signal 568.

Each of the plurality of CAM cells provides a snoop address 590 via a read port 592. A read port includes a read enable and an output address. The read port 592 includes the read enable signal 564 and the snoop address 590. In the described embodiment, the snoop address 590 includes the upper thirty-one bits of an address.

Figure 6:
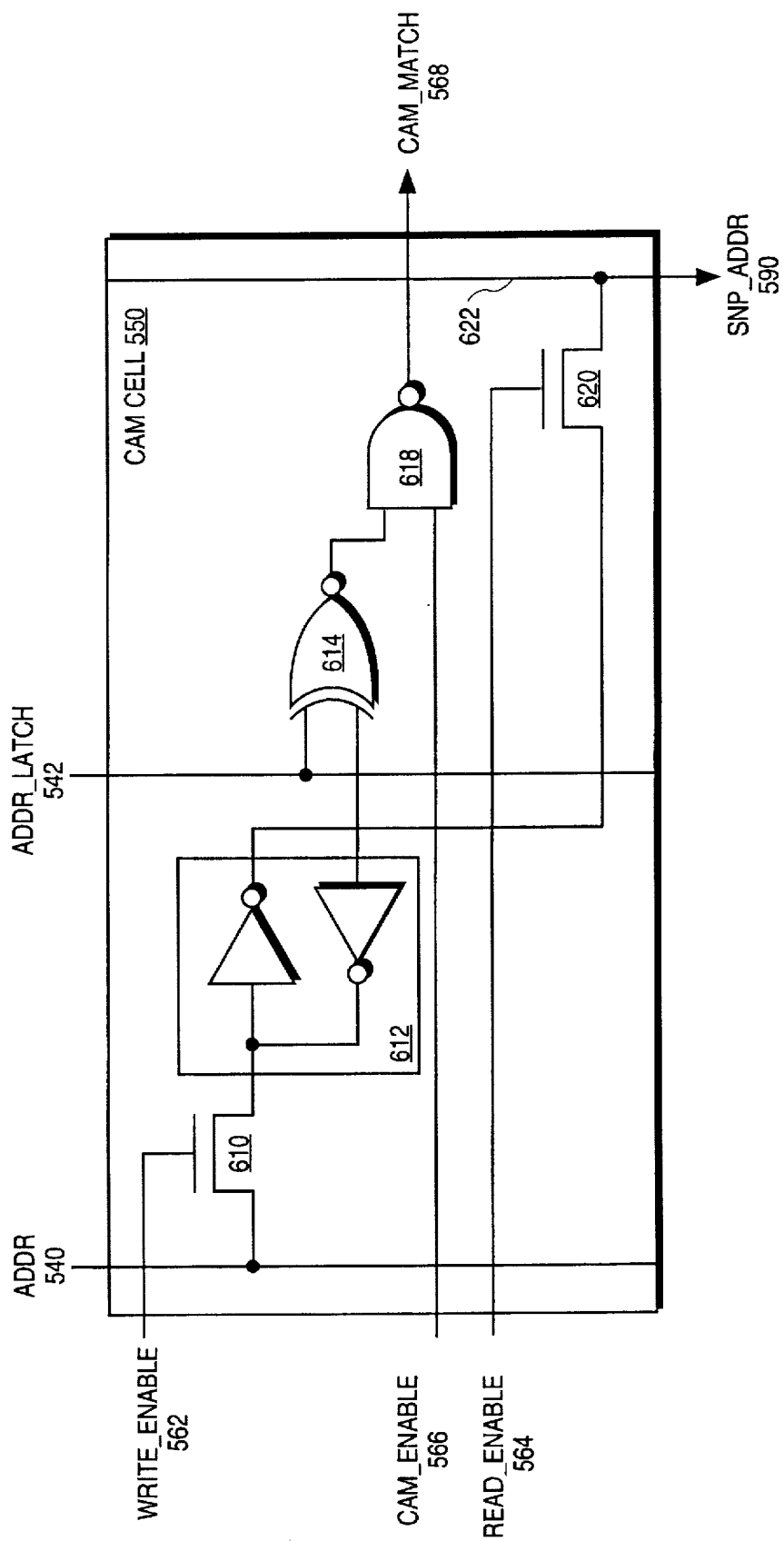
FIG. 6 is a diagram of a representative CAM cell such as CAM cell 550.

FIG. 6 is a diagram of a representative CAM cell such as CAM cell 550. The write enable signal 562, the cam enable signal 566, and the read enable signal 564 provide inputs to the CAM cell 550. Additionally address bus 540 and addr_latch bus 544 each provide an input from its respective bit which corresponds with the CAM cell 550.

In one embodiment, a n-channel device gate 610 allows the address bus 540 to provide an input to a storage cell 612 when the write enable signal 562 is asserted. The storage cell 612 provides an input to an XOR gate 614 which compares the storage cell 612 with data provided from the addr_latch bus 544. The XOR gate 614 has an inverted output. The output of the XOR gate 614 is inverted and provided to an AND gate 618. When the cam enable signal 566 is asserted, then the AND gate 618 provides an output to the cam match signal 568 indicating whether there has been a match in comparing the data stored in the storage cell 612 with the input from the addr_latch bus 542.

Storage cell 612 also provides an input to a N-channel gate 620. When the read_enable signal 564 is asserted, then the data for the bit stored in the storage cell 612 is provided to a bitline 622 for the snoop address bus 590. Each CAM cell of an entry of the snoop queue provides one bit of data toward a complete snoop address on the snoop address bus 590.

FIGS. 7–10 are flow diagrams showing various steps taken by the snoop queue 408 with reference to a particular entry 420–426 of the snoop queue. It should be noted that the various flow diagrams occur concurrently such that one entry may be performing a step of one flow diagram, while another entry may be performing a step in either the same or a different flow diagram. For example, in one case, the flow diagram of one entry may not be able to proceed until a different entry is deallocated.

Figure 7:
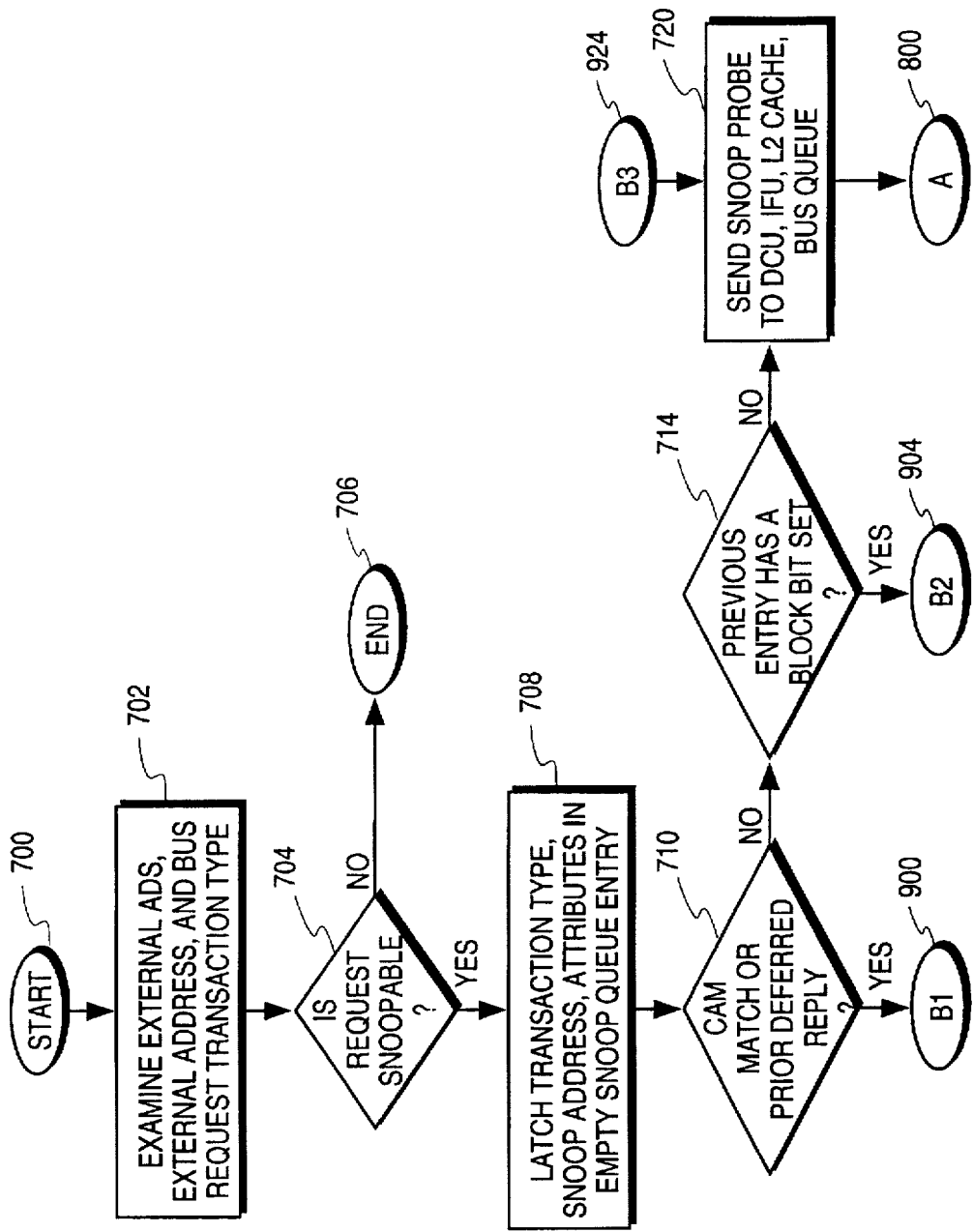
FIG. 7 is a flow diagram showing the steps taken in processing a snoop request.

FIG. 7 is a flow diagram showing the steps taken in processing a snoop request. The flow diagram starts at a block 700 and proceeds to block 702, at which the system bus 20 is monitored for the following signals: external ADS, external address, bus request transaction type, and bus request attributes. The external ADS signifies that the external address lines are valid. If this is a snoopable request, then the external address lines indicate the snoop address. The bus request transaction type includes the following types of requests: read, read invalidate, memory write, deferred reply, I/O transactions, and special cycles.

The flow diagram proceeds at block 704. If the request is not snoopable, then the flow diagram ends at block 706. However, if the request is snoopable, as determined by the signals examined in block 702, then the flow diagram proceeds at block 708. Note that, in one embodiment, an entry in the snoop queue 408 is allocated for non-snoopable requests in a similar way to that of the snoopable requests of FIG. 7.

At block 708, the transaction type and snoop address are latched into an empty entry of the snoop queue 408. From the block 708, the flow diagram proceeds at block 710.

At block 710, there is a check to see whether the snoop address matches an address in one of the other entries of the snoop queue 408. If there is a match, then the flow diagram proceeds at the flow block 900, which continues in FIG. 9 describing the snoop blocking procedure. If there has been a prior deferred reply, as will be described with reference to FIG. 11, then an address match is assumed since the deferred reply has no corresponding address to compare against. The address match is assumed in order to handle the possibility that the actual address of the deferred reply matches the address of the current request. If there is no match, then the flow diagram proceeds at the flow block 714.

Figure 9:
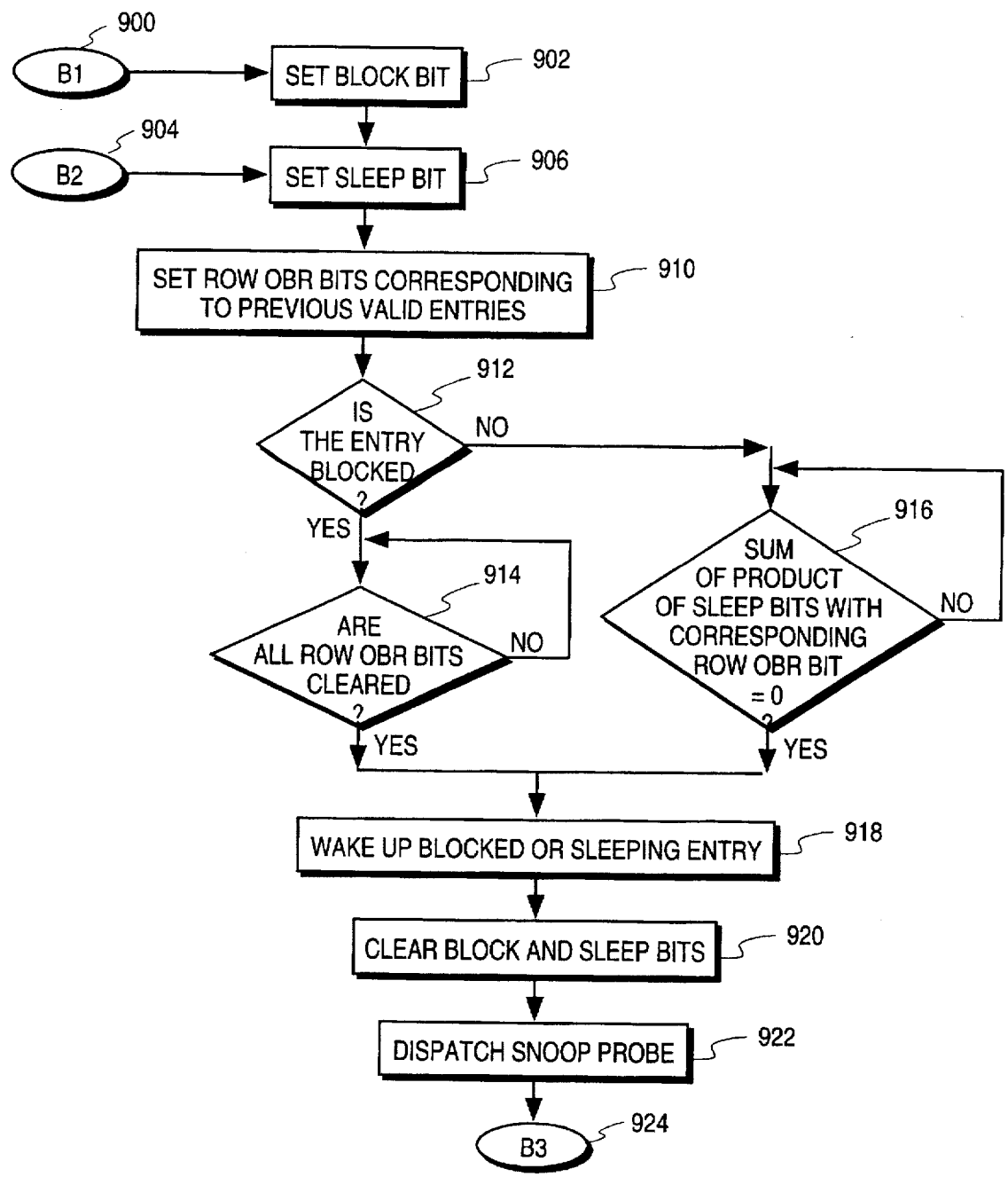
FIG. 9 is a flow diagram of the snoop blocking procedure made with respect to an entry of the snoop queue 408.

At block 714, if any of the other valid entries of the snoop queue 408 has a block bit set, then the flow diagram proceeds at the flow block 904, which continues in FIG. 9 describing the snoop blocking procedure. If no previous entry has its block bit set, then the flow diagram proceeds at block 720.

At block 720, a snoop probe is sent to the DCU 434, the IFU 436, the L2 cache 450, and the bus queue 412. Block 720 also is a continuation of the flow diagram of FIG. 9 as shown by the input to the block 720 from the flow block 924. From the block 720, the flow diagram proceeds at block 800, which is continued in FIG. 8.

Figure 8:
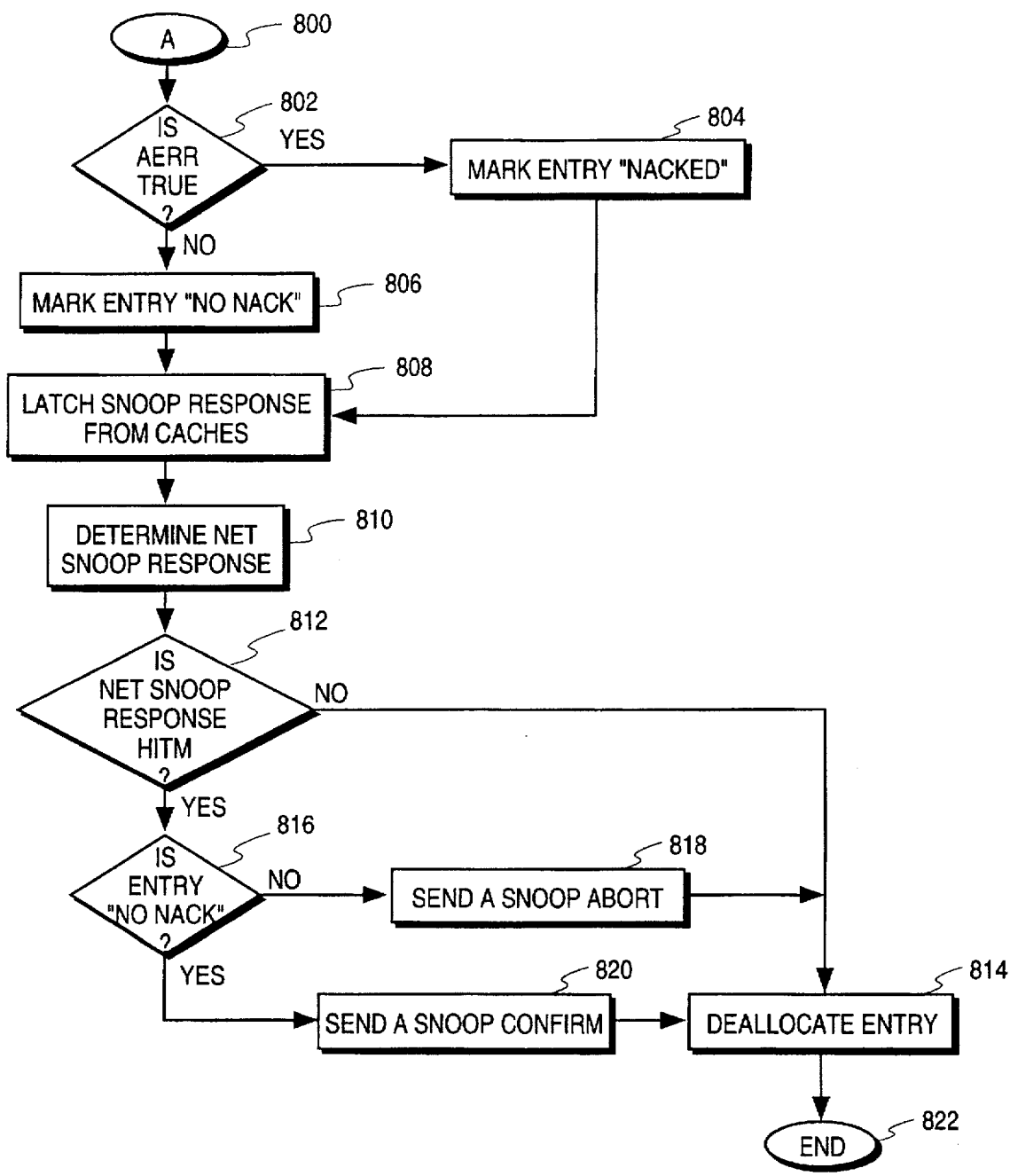
FIG. 8 is a continuation of the snoop request flow diagram of FIG. 7.

FIG. 8 is a continuation of the snoop request flow diagram of FIG. 7. From flow block 800, the flow diagram continues at block 802. At block 802, the address parity (AERR) signals on the system bus 20 are examined during the error phase 32 of the bus request. If there is an address parity error then the entry is marked as "NACKED" at the block 804. If there is no address parity error then the entry is marked as "NO NACK" at the block 806. From both blocks 804 and 806, the flow diagram proceeds at block 808, in which the snoop response from the caching units (including the DCU 434, L2 cache 450, and bus queue 412) is latched. A net snoop response is determined at block 810 using the snoop responses latched in block 808.

A determination is made whether the net snoop response is HITM at block 812. If the net snoop response is not HITM, then the flow diagram proceeds at block 814, in which the entry is deallocated from the snoop queue 408. However, if the net snoop response is HITM, then the flow chart proceeds at block 816.

At block 816, a check is made whether the entry is a "NO NACK" entry. If this entry is not a "NO NACK" entry then the flow diagram proceeds at a block 818. At the block 818, a snoop abort is sent by the external bus controller 410. However, if the entry was a "NO NACK" entry at block 816, then the flow diagram proceeds at block 820, at which a snoop confirm is sent by the external bus controller 410. Flow blocks 818 and 820 proceed at the flow block 814 at which the entry is deallocated. The flow diagram ends at block 822.

FIG. 9 is a flow diagram of the snoop blocking procedure made with respect to an entry of the snoop queue 408. The snoop blocking procedure starts at either flow block 900 or flow block 904, both of which are continuations of the flow diagram of FIG. 7. From flow block 900, the flow diagram proceeds at the flow block 902 at which the block bit 504 is set for the current entry of the snoop queue 408.

From the flow blocks 902 and 904, the flow diagram proceeds at block 906, at which the sleep bit 506 is set for the current entry of the snoop queue 408. The row OBR bits, i.e., the OBR bits of the current entry, corresponding to previous valid entries are set at the block 910. Then a determination is made whether the entry is blocked, i.e. whether the entry has its block bit set, at flow block 912.

If the entry is blocked, then the flow diagram proceeds at flow block 914. At flow block 914, the OBR bits of the current entry are checked to see if they are all cleared. If all of the row OBR bits are not cleared for that entry then the flow diagram loops back upon itself. The flow diagram will continue to loop back upon itself until there is a deallocation by one of the other entries in the snoop queue 408.

However, if at the flow block 912, the entry is not blocked, but the sleep bit is set. The flow diagram proceeds at the flow block 916. At the flow block 916, a sum of products is performed with the sleep bits and the row OBR bits of the current entry. This is similar to a matrix multiply. For example, the sleep bit of the first entry is multiplied by the first OBR bit of the current entry. Next the sleep bit of the second entry is multiplied by the second OBR bit of the current entry. This process is continued for all of the sleep bits and all OBR bits of the current entry. Finally, all of the results are added together. If the sum not zero, then the flow diagram at block 916 loops back upon itself. The flow diagram continues to loop back upon itself until all previous entries have sent a snoop probe and their block bits and sleep bits are cleared.

The flow diagram from block 914 continues at block 918 when all row OBR bits for the current entry are cleared. The flow diagram from block 916 continues at block 918 when the sum of products of the sleep bits and the row OBR bits is zero. At the block 918, the blocked or sleeping entry is woken up. The block and sleep bits of the entry are cleared at block 920, and a snoop probe is dispatched at block 922. From the block 922, the flow diagram proceeds at flow block 924, which is continued in FIG. 7, as previously described.

Figure 10:
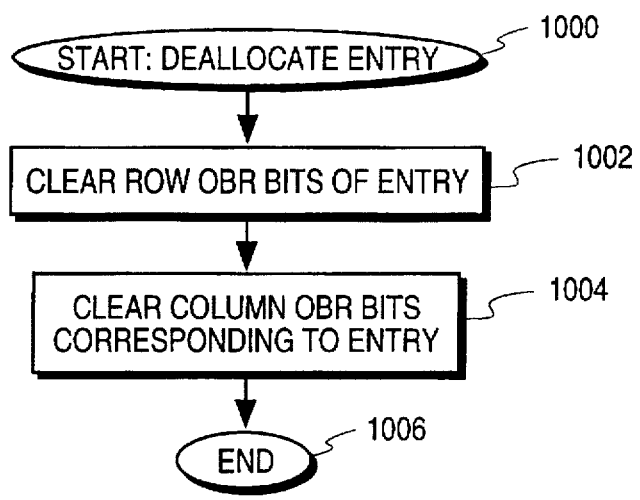
FIG. 10 is a flow diagram of the deallocation of an entry of the snoop queue.

FIG. 10 is a flow diagram of the deallocation of an entry of the snoop queue. From the block 1000, the flow diagram proceeds to the block 1002, at which the row OBR bits of the current entry are cleared. The row OBR bits, as previously explained, are all of the OBR bits for the current entry. The row relationship is easily seen in the Tables 1–3. At block 1004, the column OBR bits corresponding to the current entry being deallocated are cleared. The column OBR bits refer to the one OBR bit of each entry corresponding to the current entry. For example, if the entry #2 of the snoop queue 408 is deallocated, then column OBR bits are the one OBR bit of each of the entries that correspond to entry #2 being previously valid. The row and column relationship is easily seen in the Tables 1–3. From the block 1004, the flow diagram terminates at the block 1006.

Non-Snoopable Operations

In one embodiment, the snoop queue stores both requests which result in snoopable operations (snoopable requests) and those which do not result in snoopable operations (non-snoopable requests). The address of the non-snoopable request is compared by subsequently allocated entries into the snoop queue 408 in order to generate block and sleep bits for the new entries as previously described. One type of non-snoopable request arises from a deferred operation.

Deferred Operations

Figure 11:
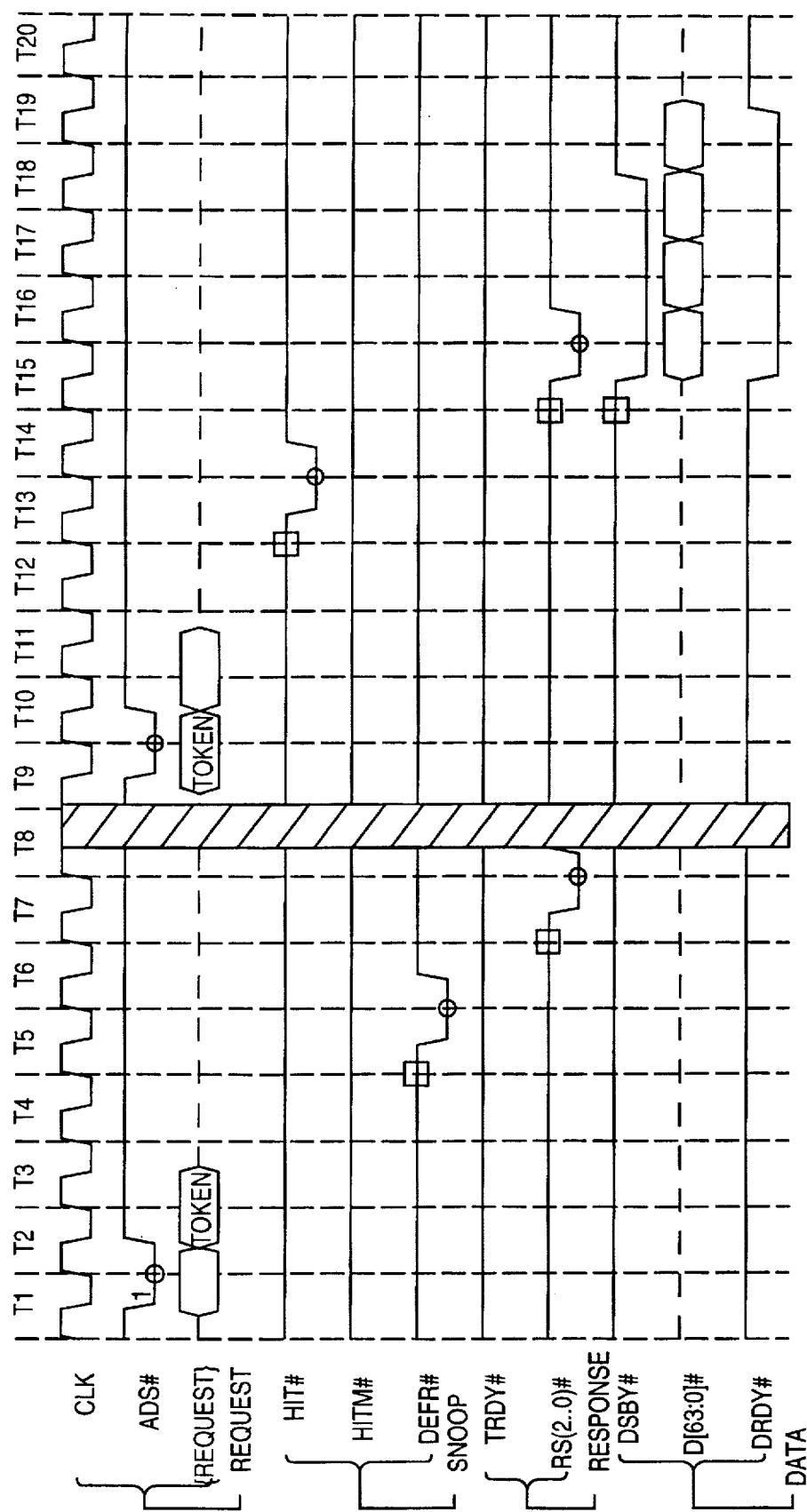
FIG. 11 is a timing diagram of a deferred operation.

FIG. 11 is a timing diagram of a deferred operation. A deferred operation allows a caching agent to delay its response to a snoop request. The caching agent provides a deferred reply when the caching agent is ready to fulfill the snoop request.

During the Request phase 31 of a bus transaction, an agent may assert a Defer Enable (DEN#) signal to indicate if the transaction can be given a deferred response. Note that the "#" symbol indicates that the signal is active low. When the DEN# signal is deasserted, the transaction must not receive a deferred response. In one embodiment, all transactions in bus-locked operations, deferred reply transactions, and writeback transactions cannot be deferred.

A deferred operation begins with a requesting agent driving a request in the form of an address onto the address bus and the requisite control signals in a manner well-known in the art. In one embodiment, a first token is also driven onto the address bus. In this embodiment, the address and the first token are driven on the bus in two consecutive clocks, as shown in FIG. 11 at clocks T2 and T3. The token is stored in a queue, referred to as a pending request queue, with an indication of the request with which it is associated.

Once a request has been placed onto the bus, a determination of which device is to be the responding agent occurs. This determination includes a responding agent recognizing the address that was driven onto the address btis. In one embodiment, the responding agent is the device which is mapped into the address space that includes the address of the request.

The responding agent then determines if it is ready to respond. In case of a read operation, the responding agent is ready to respond if the data requested is available. In case of a write operation, the responding agent is ready to respond if it begins completing the write operation upon receipt, or if capable of a post write, the responding agent is ready to respond as soon as the data and address are received. If the responding agent is ready to respond, then the responding device sends an "in-order" completion response indication and drives the necessary signals or data on the data bus at the appropriate time, thereby ending the bus transaction, and the bus operation is non-deferred.

However, if the responding agent is not ready to complete the bus transaction, then the responding agent latches the first token from the address bus and sends a deferred response at its appropriate response time. In the case of a read operation, the responding agent may not be ready to respond if the data is not ready by the time the responding agent is required to respond. In the case of a write operation, the responding agent may not be ready to respond until the write operation has been completely finished, such as in the case of a write to an I/O device.

In the snoop phase, the addressed agent determines that the transaction cannot be completed in order and asserts the DEFER# signal in T5. In T7, the addressed agent becomes the responding agent due to the deasserted state of the HITM# signal in T6. The responding agent returns a deferred response in T7 by asserting the proper encoding on the RS[2:0]# signals. The RS[2:0]# signals are used to encode different types of responses, including a deferred response.

A number of additional bus transactions may be run on the bus after the requesting agent receives the deferred response before the responding agent is finally able to satisfy the request. When the responding agent is ready to complete the deferred bus operation (e.g., the data does become available to the responding agent), the responding agent arbitrates for ownership of the address bus and the control bus.

Once ownership has been granted to the responding agent, the responding agent sends a deferred reply. As part of the deferred reply, the responding agent sends a second token on the address bus, a deferred reply signal on the control bus, and any appropriate data on the data bus. In one embodiment, the second token is the same as the first token; however, in other embodiments, the first and second tokens may not be the same, yet they have a unique relationship to allow agents to correctly associate one with the other. In FIG. 11, the second token is shown at clock T10.

The requesting agent monitors the address bus, along with other agents, and receives the token. The requesting agent latches the second token. The requesting agent then determines whether the second token sent from the responding agent matches one of the outstanding tokens in its pending request queue.

If there is not a match with the first token, then the data on the data bus and the completion signals are ignored. However, if there is a match then the deferred reply data on the data bus and/or the completion signals are the data or completion signals originally requested by the requesting agent, and the requesting agent receives the completion signals and/or latches the data on the data bus, thus completing the second bus transaction. FIG. 11 shows the deferred reply data on the data bus and the deferred reply response signals at clocks T16–T19.

A DEFER# signal in conjunction with a HITM# signal is used to determine when a response is to be deferred. The HITM# signal, when asserted indicates the presence of modified data in the cache. In-order completion of a transaction is indicated by the DEFER# signal being deasserted or the HITM# signal being asserted during the Snoop phase, followed by normal completion or implicit write back response in the response phase. When the Defer Enable (DEN#) signal is inactive, the transaction can be completed in-order or it can be retried, but not deferred. Thus, any bus agent which does not support a deferred response may use this signal for compatibility, requiring that the transaction either be completed in-order or retried.

In one embodiment, if a deferred reply is a non-snoopable request which is entered into the snoop queue 408, then a bogus address is stored in the address field 534 of the entry for the deferred reply since the snoop queue 408 is not provided with a true address. If a subsequent entry due to a snoopable request is entered into the snoop queue 408, this subsequent entry will detect the presence of the deferred reply via information stored in the snoop type bits 512 of the entry associated with the deferred reply. Since the address of the deferred reply is unknown to the snoop queue 408, this subsequent entry assumes that its own address matches that of the deferred reply. Therefore, the block bit 504 for this subsequent entry is set, as has already been described in FIGS. 7 and 9.

Thus, an apparatus and method for maintaining and updating a queue with blocking conditions is disclosed. The invention provides a queue that is scaleable to higher frequencies and deeper queue structures. The snoop queue 408 can easily be expanded to add more entries and/or accommodate more address inputs.

Additionally, the queue structure need not be limited to keeping track of snoop requests. For example, the queue could be used to maintain entries corresponding to pending reads and writes. Some reads may be blocked by previous writes. Some reads may be blocked by previous reads. A "strong" ordering and a "weak" ordering may be allowed dependent upon the addresses of the reads and writes, wherein the "strong" ordering is performed by using the block bits to prevent initiation of a new operation until a previous operation has completed, and the "weak" ordering is performed by using the sleep bits to prevent initiation of a new operation until a previous operation has been initiated.

The specific arrangements and methods described herein are merely illustrative of the principles of this invention. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. A method of maintaining cache coherence comprising the steps of:
 (a) allocating an entry in a snoop queue to a snoopable request;
 (b) blocking the snoopable request to delay performing a snoop operation in response to the snoopable request until a blocking condition is satisfied;
 (c) performing the snoop operation in response to the snoopable request after the blocking condition is satisfied;
 (d) deallocating the entry from the snoop queue.

2. The method of claim 1 wherein the step (c) of performing the snoop operation further includes the step of
 (c1) sending a snoop inquiry to one or more caching units.

3. The method of claim 2 wherein the step (c) of performing the snoop operation further includes the step of
 (c2) receiving a snoop response from the one or more caching units.

4. The method of claim 2 wherein the step (c) of performing the snoop operation further includes the step of
 (c2) receiving a snoop response from the one or more caching units; and
 (c3) determining a cumulative snoop response from the snoop responses received from the one or more caching units, wherein if the cumulative snoop response indicates a hit to a modified cache line, then sending a snoop abort to the one or more caching units upon a first condition and sending a snoop confirm to the one or more caching units upon a second condition.

5. The method of claim 4 wherein the first condition is satisfied if an error occurred during the snoop operation.

6. The method of claim 4 wherein the first condition is satisfied if an address parity error occurred during the snoop operation.

7. The method of claim 4 wherein the first condition is satisfied if an address parity error occurred during the snoop operation, otherwise the second condition is satisfied.

8. The method of claim 4 wherein the steps (a)–(d) are performed for a first snoopable request and the steps (a)–(d) are performed for a second snoopable request, and performing the steps (a)–(d) corresponding to the first snoopable request at least partially overlaps in time with performing the steps (a)–(d) corresponding to the second snoopable request.

9. A method of maintaining cache coherence comprising the steps of:
 (a) allocating a first entry in a snoop queue corresponding to a first bus request having an unknown address;

(b) allocating a second entry in the snoop queue corresponding to a second bus request;

(c) blocking the second entry from starting a snoop operation corresponding to the second bus request until the first entry has been deallocated from the snoop queue.

10. The method of maintaining cache coherence of claim 9 wherein the first bus request is a deferred reply from a caching agent, wherein the deferred reply has an associated token instead of an address.

* * * * *